(12) United States Patent
Tanaka (10) Patent No.: US 12,136,006 B2
(45) Date of Patent: Nov. 5, 2024

(54) PRINTING CONTROL APPARATUS, PRINTING APPARATUS, AND NON-TRANSITORY COMPUTER READABLE MEDIUM STORING PROGRAM PROVIDING AUXILIARY IMAGE FOR PERFORMING POST-PROCESSING MANUALLY

(71) Applicant: FUJIFILM Business Innovation Corp., Tokyo (JP)

(72) Inventor: Noriaki Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 356 days.

(21) Appl. No.: 17/396,788

(22) Filed: Aug. 9, 2021

(65) Prior Publication Data

US 2022/0269914 A1 Aug. 25, 2022

(30) Foreign Application Priority Data

Feb. 22, 2021 (JP) .................................. 2021-026529

(51) Int. Cl.
*G06K 15/00* (2006.01)
*G06K 15/02* (2006.01)

(52) U.S. Cl.
CPC ......... *G06K 15/403* (2013.01); *G06K 15/002* (2013.01); *G06K 15/1803* (2013.01); *G06K 15/1852* (2013.01)

(58) Field of Classification Search
CPC .............. G06K 15/403; G06K 15/002; G06K 15/1803; G06K 15/1852; H04N 1/00466; G06F 3/1264
USPC ............................................... 358/1.13, 1.15
See application file for complete search history.

(56) References Cited

U.S. PATENT DOCUMENTS

| | | | |
|---|---|---|---|
| 6,873,426 B1 * | 3/2005 | Farrell | B42C 19/00 358/1.9 |
| 7,777,907 B2 | 8/2010 | Anno et al. | |
| 2004/0190042 A1 * | 9/2004 | Ferlitsch | H04L 69/329 710/16 |
| 2009/0059285 A1 | 3/2009 | Akashi | |
| 2009/0087242 A1 * | 4/2009 | Sato | G03G 15/6538 399/407 |

FOREIGN PATENT DOCUMENTS

| | | |
|---|---|---|
| JP | 2006308692 | 11/2006 |
| JP | 2009059088 | 3/2009 |
| JP | 2011060071 | 3/2011 |

OTHER PUBLICATIONS

"Office Action of Japan Counterpart Application", issued on Sep. 3, 2024, with English translation thereof, pp. 1-6.

* cited by examiner

*Primary Examiner* — Kent Yip
(74) *Attorney, Agent, or Firm* — JCIPRNET (57) ABSTRACT

A printing control apparatus includes a processor configured to receive instruction information including print data and post-processing information indicating content of post-processing scheduled to be performed on paper on which an image based on the print data is printed, and, in a case where the post-processing included in the instruction information is not performed by a post-processing apparatus, generate an auxiliary image that assists a user to perform the post-processing, based on the post-processing information, and print the auxiliary image, together with the image based on the received print data, on the paper.

7 Claims, 7 Drawing Sheets

PRINTING CONTROL APPARATUS, PRINTING APPARATUS, AND NON-TRANSITORY COMPUTER READABLE MEDIUM STORING PROGRAM PROVIDING AUXILIARY IMAGE FOR PERFORMING POST-PROCESSING MANUALLY

CROSS-REFERENCE TO RELATED APPLICATIONS

This application is based on and claims priority under 35 USC 119 from Japanese Patent Application No. 2021-026529 filed Feb. 22, 2021.

BACKGROUND

(i) Technical Field

The present invention relates to a printing control apparatus, a printing apparatus, and a non-transitory computer readable medium storing a program.

(ii) Related Art

In recent years, a printing system has been proposed in which a function in a finisher is replaced by another finisher (see, for example, JP2006-308692A).

The printing system disclosed in JP2006-308692A includes a client PC, a printer, an inline finisher connected inline to the printer, and an offline finisher connected to a network, in which, in a case where the stop of the inline finisher is detected, the printer generates post-processing setting information indicating content of processing to be executed by the inline finisher and transmits the post-processing setting information to the offline finisher.

SUMMARY

Aspects of non-limiting embodiments of the present disclosure relate to a printing control apparatus, a printing apparatus, and a non-transitory computer readable medium storing a program that enable a user to easily perform post-processing manually, as compared with a case where information assisting the post-processing is not printed on a printed matter on which the post-processing scheduled to be performed has been not performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printing control apparatus including a processor configured to receive instruction information including print data and post-processing information indicating content of post-processing scheduled to be performed on paper on which an image based on the print data is printed, and, in a case where the post-processing included in the instruction information is not performed by a post-processing apparatus, generate an auxiliary image that assists a user to perform the post-processing, based on the post-processing information, and print the auxiliary image, together with the image based on the received print data, on the paper.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings. In each drawing, components having substantially identical functions are designated by identical reference numerals, and description thereof will not be repeated.

Summary of Exemplary Embodiment

A printing control apparatus according to the present exemplary embodiment includes a processor configured to receive print data and instruction information including post-processing information indicating content of post-processing scheduled to be performed on paper on which an image based on the print data is printed, and, in a case where the post-processing included in the instruction information is not performed by a post-processing apparatus, generate an auxiliary image that assists a user to perform the post-processing, based on the post-processing information and print the auxiliary image, together with the image based on the received print data, on the paper.

The post-processing includes, for example, needle binding (also referred to as stapling), needleless binding (also referred to as needleless stapling), drilling (also referred to as punching), folding, bookbinding, cutting, and the like. The "stapling" refers to a process of binding a plurality of sheets of paper with a needle. The "punching" refers to a process of punching two holes in the paper. The "folding" refers to a process of folding the paper into a Z shape.

A "case where the post-processing is not performed" includes, for example, the following cases.
  (a) a case where the printing apparatus does not include a post-processing apparatus.
  (b) a case where the post-processing apparatus is not in a state of being performed due to shortage of consumables, failure, and the like.
  (c) a case where a function of the post-processing apparatus does not correspond to required post-processing.
  (d) a case of being instructed to not to perform the post-processing by a user.

The auxiliary image includes, for example, the following types.
(a) An image imitating a result of the post-processing.
The image is printed at a position where the post-processing is originally performed.
(b) An image that serves as a reference in a case where the post-processing is manually performed.
The image is printed at a position different from the position where the post-processing is originally performed. The image that serves as the reference may be an image that imitates the result of the post-processing, which is printed at the position where the post-processing is originally performed.

A method for printing the auxiliary image on the paper includes, for example, the following methods.
(a) A method for embedding a command for generating the auxiliary image in the print data received by the printing control apparatus and printing an image based on the print data including the command on the paper.
As a result, the auxiliary image and the image based on the print data received by the printing control apparatus are printed on the paper.
(b) A method for generating the image based on the print data received by the printing control apparatus and the auxiliary image, respectively, and superimposing and printing the images on the paper.

Exemplary Embodiment

Figure 1:
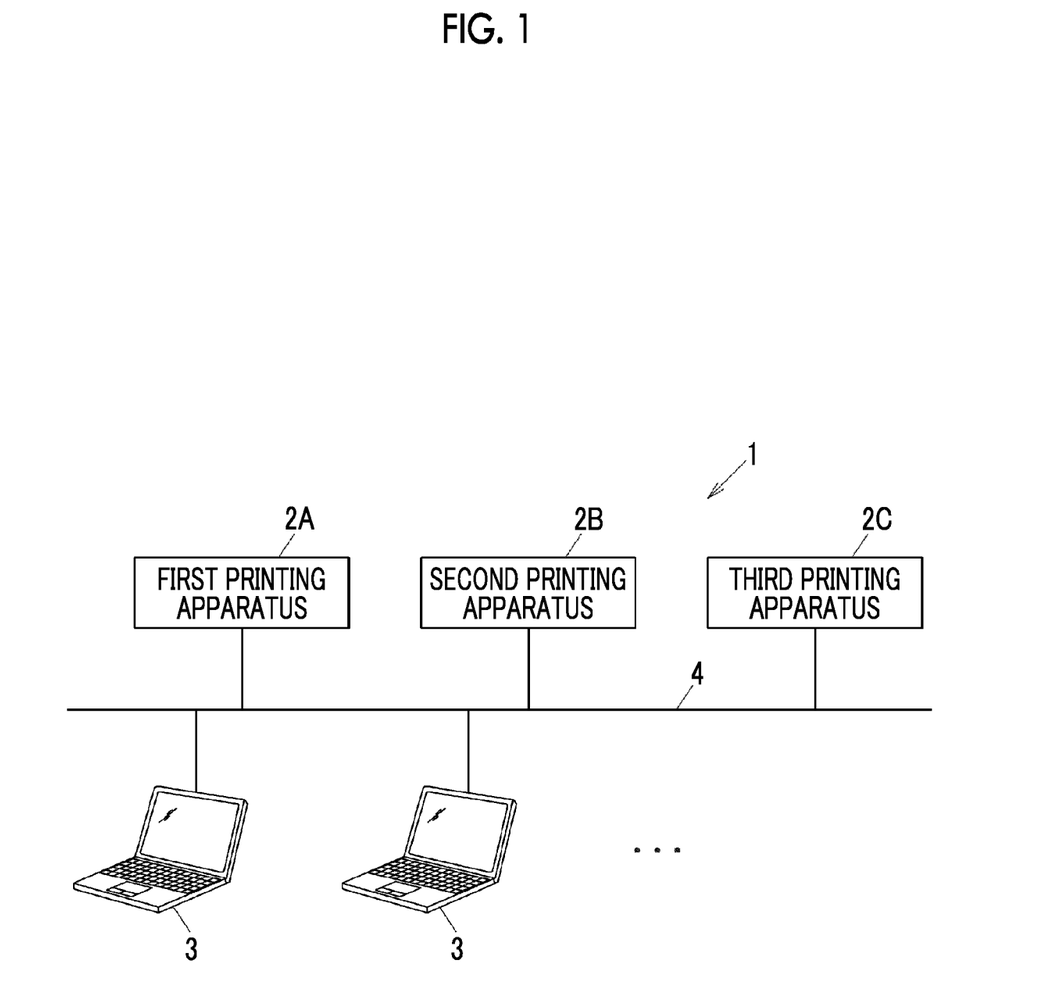
FIG. 1 is a diagram showing an example of a schematic configuration of a printing system according to an exemplary embodiment of the present invention.

FIG. 1 is a diagram showing an example of a schematic configuration of a printing system according to the exemplary embodiment of the present invention. A printing system 1 includes a first printing apparatus 2A having a post-processing function, a second printing apparatus 2B also having the post-processing function, and a third printing apparatus 2C having no post-processing function (the apparatuses are collectively referred to as a "printing apparatus 2"), a plurality of client PCs 3, and a network 4 connecting the printing apparatus 2 to the client PCs 3. The printing apparatus 2 is an example of an image forming apparatus to which the printing control apparatus is applied.

In FIG. 1, the first printing apparatus 2A, the second printing apparatus 2B, and the third printing apparatus 2C are respectively shown one by one, but each of the first printing apparatus 2A, the second printing apparatus 2B, and the third printing apparatus 2C maybe configured to be connected to the network 4 in plural. Further, only the first printing apparatus 2A or the second printing apparatus 2B may be configured to be connected to the network 4 without using the third printing apparatus 2C.

Further, a place where the printing apparatus 2 is installed may be, for example, in the same building of an identical company, or in different buildings such as a head office and a branch office. Further, the place where the printing apparatus 2 is installed is not limited to the identical company, and may be in a facility such as a school, a hospital, a shared office, or a convenience store.

The first printing apparatus 2A is configured in such a way that a high functional post-processing apparatus 29 (refer to FIG. 2) is connected to a printer 20 (refer to FIG. 2) via a paper transport path, the second printing apparatus 2B is configured in such a way that a low functional post-processing apparatus 29 is connected to the printer 20 via the paper transport path, and the third printing apparatus 2C is configured with only the printer 20. Here, the high function represents both a case where a larger number of post-processing can be performed than the low function and a case where the upper limit number of sheets for the post-processing is larger than the low function. In the first printing apparatus 2A and the second printing apparatus 2B, the post-processing apparatus 29 may be installed near the printer 20 without connecting via the paper transport path, and, for example, the post-processing apparatus 29 may perform the post-processing based on a ticket or the like showing the content of the post-processing.

The network 4 is, for example, a Local Area Network (LAN), a Wide Area Network (WAN), an intranet, the Internet, or the like, and may be wired or wireless.

Configuration of Client PC

The client PC 3 is an information processing terminal such as a Personal Computer (PC). The client PC 3 may be a portable information processing terminal such as a notebook computer or a tablet terminal, or a mobile communication terminal such as a multifunctional mobile phone (smartphone).

The client PC 3 converts document data into print data which can be interpreted by the printing apparatus 2, for example, print data described in a Page Description Language (PDL), using a printer driver, adds print setting information that is recorded with various types of setting (for example, various printing conditions such as double-sided or single-sided and the number of copies) necessary for execution of printing and a user ID that identifies a user who requests printing, to the print data, and transmits the print data to the printing apparatus 2 designated by the user or the printing apparatus 2 specified in advance in the printing system 1, as a print job. In a case of performing post-processing, the printer driver adds the post-processing information to the print job. The post-processing information indicates the content of the post-processing scheduled to be performed on the paper on which an image obtained by interpreting the print data is printed according to the print setting information.

Configuration of Printing Apparatus

Figure 2:
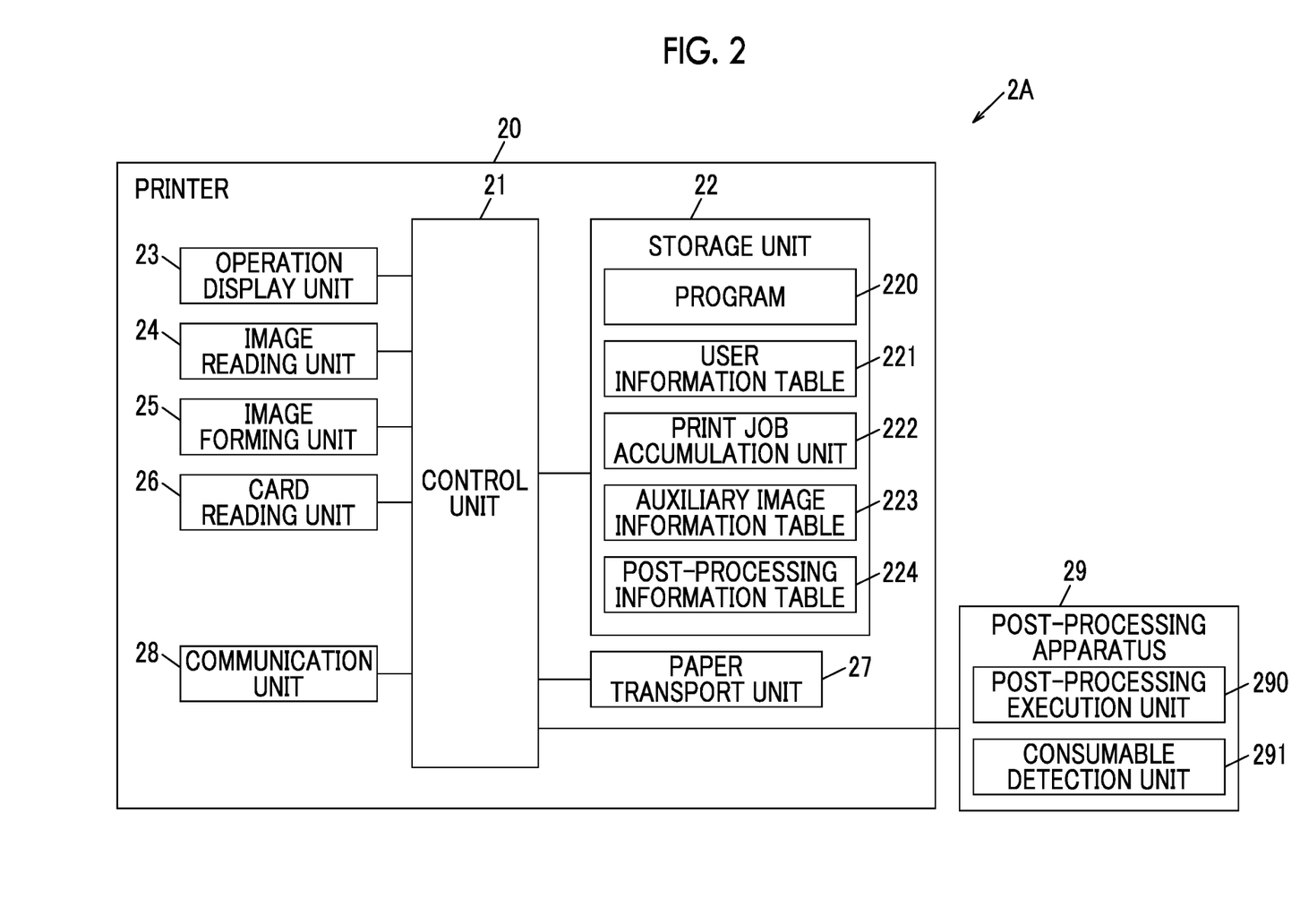
FIG. 2 is a block diagram showing an example of a configuration of a first printing apparatus.

FIG. 2 is a block diagram showing an example of a configuration of the first printing apparatus 2A. Block diagrams showing configurations of the second printing apparatus 2B and the third printing apparatus 2C are not shown. The first printing apparatus 2A includes the printer 20 and the post-processing apparatus 29. The second printing apparatus 2B has only a difference in the function of the post-processing apparatus 29 from the first printing apparatus 2A, but is configured in the same manner as the first printing apparatus 2A. The third printing apparatus 2C is configured such that the post-processing apparatus 29 is not connected to the printer 20, and does not store a post-processing information table 224 which will be described later. Here, the first printing apparatus 2A will be described.

The printer 20 includes a control unit 21 that controls each unit of the first printing apparatus 2A, in which the control unit 21 is connected to a storage unit 22, an operation display unit 23, an image reading unit 24, an image forming unit 25, a card reading unit. 26, a paper transport unit 27, and a communication unit 28, and further is connected to a post-processing apparatus 29. The printer 20 and the post-processing apparatus 29 are connected to each other by a paper transport path (not shown). The operation display unit 23 is an example of a display device or a display unit.

The printer 20 is, for example, a multifunction machine having a plurality of functions such as scanning, printing, and copying.

The control unit 21 is configured with a processor such as a Central Processing Unit (CPU), an interface, and the like. The processor of the control unit 21 executes a job, such as a print job, a scan job, and a copy job, by executing a program 220 stored in the storage unit 22. The print job is an example of instruction information.

The print job is a job of printing and outputting the print data included in the job transmitted from the client PC 3 on the paper by the image forming unit 25. The print job includes a user ID who requests the job, the print data, the print setting information, and the post-processing information in a case of being requested.

The scan job is a job of reading image data from a document by the image reading unit 24. The copy job is a job of printing and outputting the image data obtained by the scan job on the paper by the image forming unit 25. Each of the print job and the copy job is also referred to as a printing job.

Figure 3:
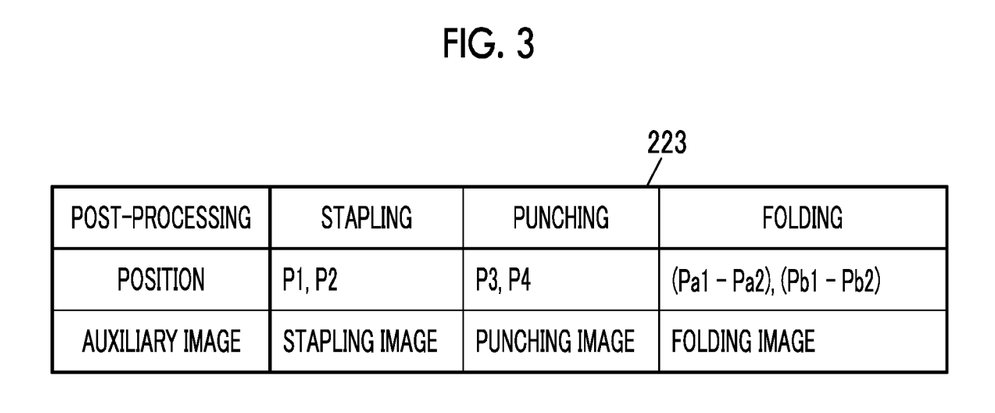
FIG. 3 is a diagram showing an example of an auxiliary image information table.
Figure 4:
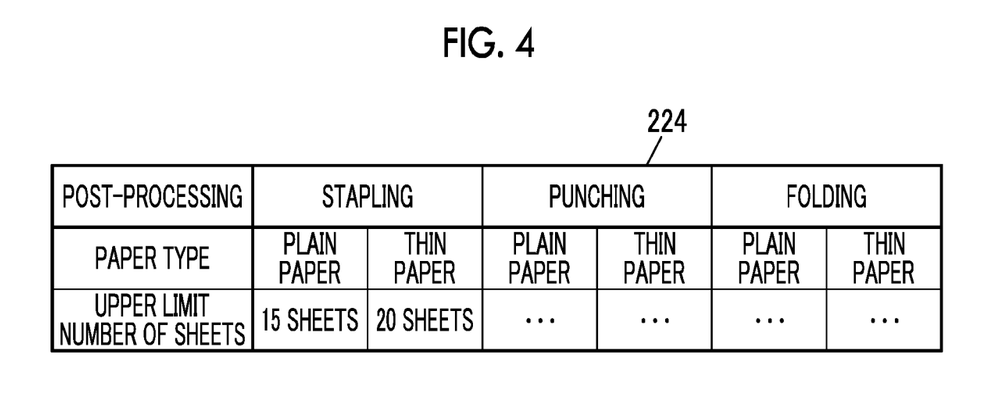
FIG. 4 is a diagram showing an example of a post-processing information table.

The storage unit 22 is configured with a Read Only Memory (ROM), a Random Access Memory (RAM), a hard disk, and the like, and stores various types of information such as the program 220, a user information table 221, a print job accumulation unit 222, an auxiliary image information table 223 (refer to FIG. 3), and the post-processing information table 224 (refer to FIG. 4).

The operation display unit 23 inputs and displays information. The operation display unit 23 is, for example, a touch panel display, and has a configuration in which a touch panel is arranged to be superimposed on a display such as a liquid crystal display.

The image reading unit 24 includes an automatic paper feeding device provided on a platen, and a scanner that optically reads a document image from a document placed on the platen or a document sent by the automatic paper feeding device.

The image forming unit 25 creates a printed matter by forming an image on the paper fed from a paper feed cassette using, for example, an electrophotographic method, an inkjet method, or the like. The image forming unit 25 converts the print data described in PDL into the image data consisting of raster data. In a case where the post-processing is not performed, the image forming unit 25 superimposes the auxiliary image on the print data included in the print job (including embedding a command for generating the auxiliary image), converts the print data including the auxiliary image into the image data consisting of the raster data, and prints the image data on the paper according to the print setting information included in the print job. In a case where the post-processing included in the print job is performed, the image forming unit 25 prints, on the paper, the image data (hereinafter, also simply referred to as an "image") obtained by performing conversion on the print data without superimposing the auxiliary image on the print data.

In a case where an IC card possessed by the user is held over, the card reading unit 26 reads a user ID and a password as user information from the IC card.

The paper transport unit 27 transports the paper fed from a paper feed tray to the image forming unit 25 under the control of the control unit 21, transports the paper printed by the image forming unit 25 to a discharge tray in a case where the post-processing is not performed, transports the paper to the post-processing apparatus 29 via the paper transport path in a case where the post-processing is performed, and transports the paper, in which the post-processing has been performed by the post-processing apparatus 29, to the discharge tray.

The communication unit 28 is connected to the client PC 3 and other printing apparatuses, such as the second printing apparatus 2B and the third printing apparatus 2C, via the network 4.

The post-processing apparatus 29 includes a post-processing execution unit 290 that executes (also performs) the post-processing, and a consumable detection unit 291 that detects the shortage, the remaining amount, and the like of consumables (for example, staples for stapling) used for the post-processing. In a case where the shortage of consumables is detected, the consumable detection unit 291 notifies the control unit 21 of the shortage.

In the user information table 221, the user ID and the password are recorded for each user. The user information consisting of the user ID and the password is recorded by the control unit 21 based on an operation of a manager.

The print job accumulation unit 222 is an area in which the printing apparatus 2 accumulates the print job received from the client PC 3 or another printing apparatus 2 for each user.

Configuration of Auxiliary Image Information Table

FIG. 3 is a diagram showing an example of the auxiliary image information table 223. The auxiliary image information table 223 includes a plurality of items represented by post-processing names such as "stapling", "punching", and "folding". The auxiliary image information including the items is recorded by the control unit 21 based on the operation of the manager. The post-processing is not limited to the stapling, the punching, and the folding.

Further, in the auxiliary image information table 223, a position, at which the auxiliary image is superimposed on the print data in each post-processing, and the auxiliary image are recorded in association with each other. In a case where the post-processing is the "stapling", a position, at which a stapling image is superimposed on the print data, is recorded as coordinates P1 and P2. The coordinates P1 and P2 are represented by, for example, P1 (xa, ya) and P2 (xa, yb). In a case where the post-processing is the "punching", the position, at which a punching image is superimposed on the print data, is recorded as coordinates P3 and P4. The coordinates P3 and P4 are represented by, for example, P3 (xa, yc) and P4 (xa, yd). In a case where the post-processing is the "folding", the position, at which a folding image is superimposed on the print data, is recorded as a starting point coordinate Pa1 and an ending point coordinate Pa2 for a first line auxiliary image, and a starting point coordinate Pb1 and an ending point coordinate Pb2 for a second line auxiliary image. A specific example of the auxiliary image will be described later. The stapling image, the punching image, and the folding image are examples of the auxiliary image or an image imitating the result of the post-processing.

Configuration of Post-Processing Information Table

FIG. 4 is a diagram showing an example of the post-processing information table 224. The post-processing information table 224 includes a plurality of major items represented by post-processing names such as "stapling", "punching", and "folding", and includes sub items represented by paper types, such as "plain paper" and "thin paper", for each major item. The post-processing information including the major items and the sub items is recorded by the control unit 21 based on the operation of the manager to correspond to functions included in the post-processing apparatus 29 connected to the printer 20.

In the "stapling", the maximum number of sheets, on which stapling can be performed, is recorded for each paper type. In the "punching", the maximum number of sheets, on which punching can be performed, is recorded for each paper type. In the "Folding", the maximum number of sheets, on which folding can be performed, is recorded for each paper type. For example, in a case where the post-processing apparatus 29 connected to the printer 20 has a stapling function and a punching function but does not have a folding function, the post-processing information table 224 is recorded with the upper limit number of sheets for the "stapling" and the "punching" but is recorded with nothing for the "folding". The items are not limited to the above description, and a paper size, a paper orientation, and the like may be used. In addition, thick paper or the like may be included in the paper type. Further, the upper limit number of sheets can be set to 0. Therefore, for example, in a case where the paper type is the thick paper, setting can be performed in which the stapling cannot be performed.

Example of Auxiliary Image

FIGS. 5A to 5E are diagrams for explaining an example of the auxiliary image.

Figure 5A:
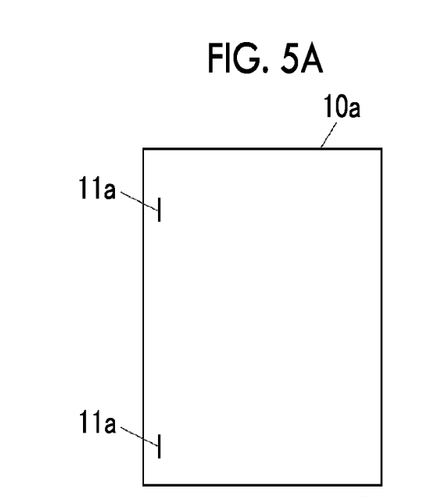
FIGS. 5A to 5E are diagrams for explaining examples of auxiliary images.

FIG. 5A is a diagram showing a state in which an auxiliary image 11a based on the stapling image is printed on A4 size paper 10a. The stapling can be performed manually by aligning a position of a stapler with the stapling image.

Figure 5B:
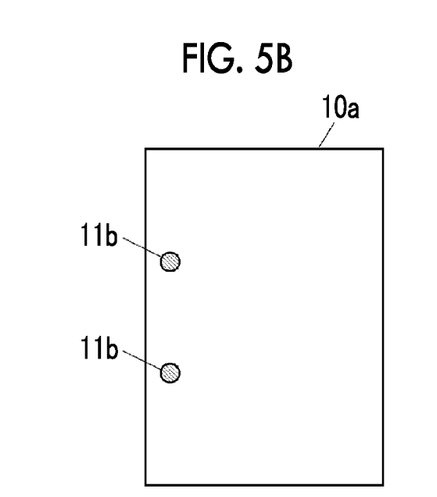

FIG. 5B is a diagram showing a state in which an auxiliary image 11b based on the punching image is printed on the A4 size paper 10a. The punching image is printed at a central position of a punching hole. The punching image may be a circular image indicating the punching hole, or an image having a shape different from the punching hole (for example, a star mark, a triangular mark, or the like).

Figure 5C:
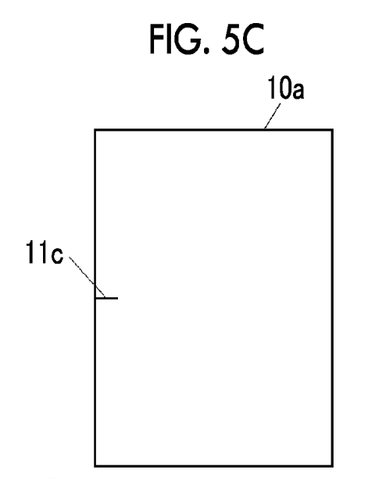

FIG. 5C shows a modification example of FIG. 5B, and is a diagram showing a state in which an auxiliary image 11c represented by a line image indicating a central position between two punching holes is printed on the A4 size paper 10a. An alignment mark provided at a center of a hole puncher can be manually punched in accordance with the auxiliary image 11c.

Figure 5D:
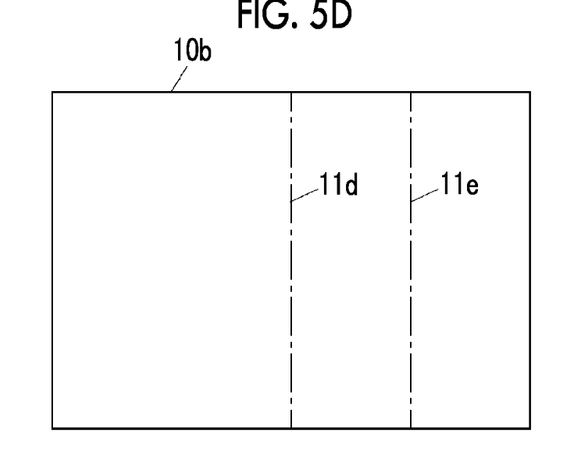
Figure 5E:
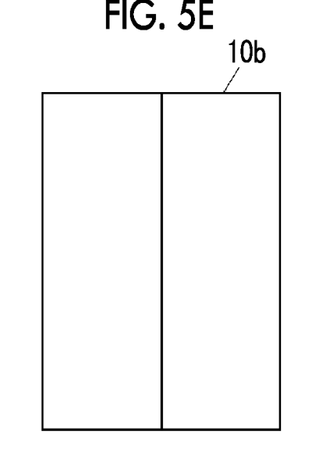

FIG. 5D is a diagram showing a state in which an auxiliary image 11d based on the folding image having dotted lines is printed on A3 size paper 10b. Folding can be manually performed by folding downward along a first line auxiliary image 11d and then folding upward along a second line auxiliary image 11e, to a long side of A3 size paper 10b and, as shown in FIG. 5E, the A3 size paper 10b can be folded into an A4 size.

Next, the control unit 21 will be described.

In a case where the control unit 21 receives the print job from the client PC 3 or the other printing apparatus 2, the control unit 21 accumulates the received print job in the print job accumulation unit 222 corresponding to the user ID included in the print job. The print job may be fetched from a recording medium, such as a USB memory, and may be accumulated in the print job accumulation unit 222.

In a case where the post-processing included in the print job is not performed, the control unit 21 generates an auxiliary image that assists the user in performing the post-processing that is not performed based on the post-processing information, and prints the auxiliary image, together with an image based on the print data, on the paper. In a case where post-processing corresponding to partial post-processing included in the print job is not performed, the control unit 21 may generate a first auxiliary image that assists in the partial post-processing that is not performed, and may print the first auxiliary image, together with the image based on the print data, on the paper. Further, in a case where there is an instruction to not perform the post-processing scheduled to be performed, the control unit 21 may generate a second auxiliary image that assists in the post-processing scheduled to be performed, and may print the first auxiliary image and the second auxiliary image, together with the image based on the print data, on the paper.

Operation of Printing System

Figure 7:
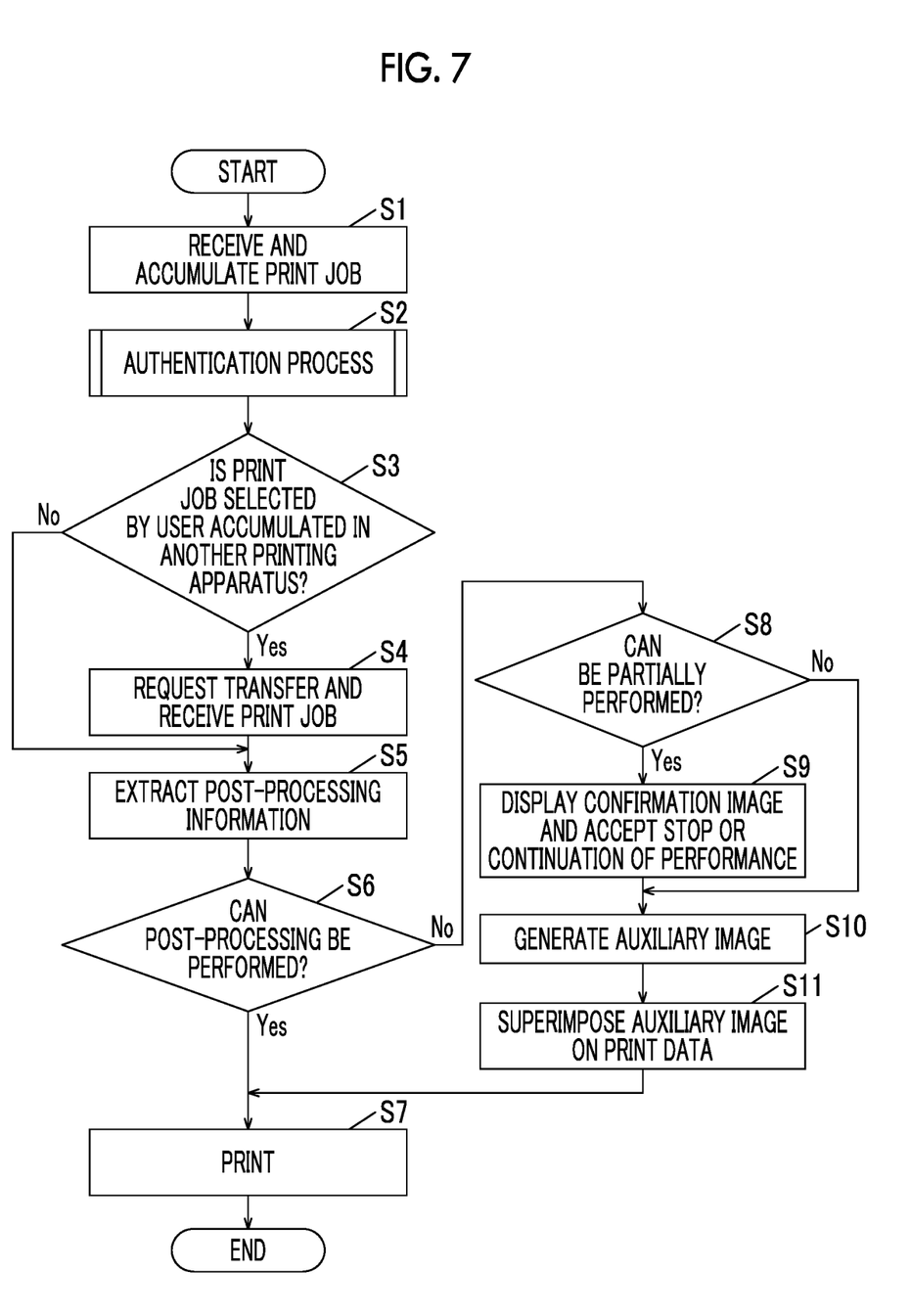
FIG. 7 is a flowchart showing an example of an operation of a printing apparatus.
Figure 8:
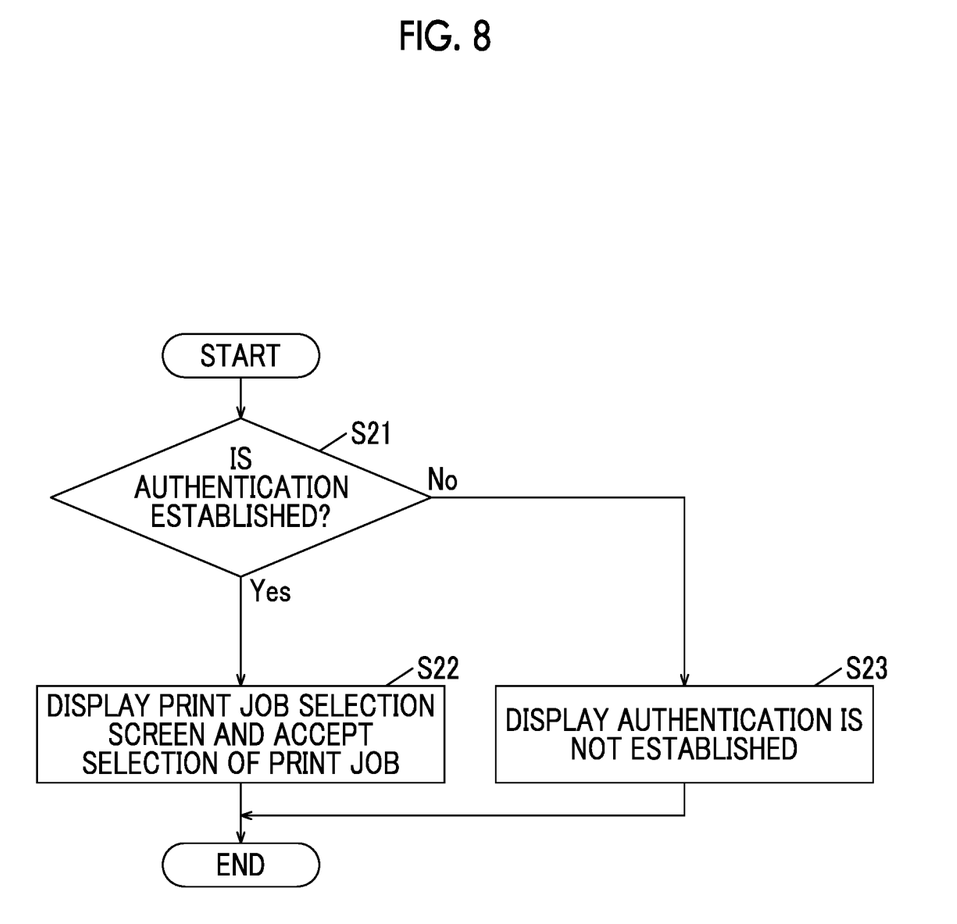
FIG. 8 is a flowchart showing details of step S2 shown in FIG. 7.

Next, an example of an operation of the printing system 1 will be described with reference to FIGS. 7 and 8. FIG. 7 is a flowchart showing an example of an operation of the printing apparatus 2 that performs authentication. FIG. 8 is a flowchart showing details of step S2 shown in FIG. 7. Unless specified otherwise, it is assumed that the control unit 21 of the printing apparatus 2 executes the operation.

(1) Basic Operation

A case where the printing apparatus 2 which performs authentication is the first printing apparatus 2A will be described. The control unit 21 of the first printing apparatus 2A receives the print job transmitted from the client PC 3 (S1). The control unit 21 accumulates the received print job in the print job accumulation unit 222 corresponding to the user ID included in the print job.

In a case where the user holds an IC card owned by the user over the card reading unit 26 of the first printing apparatus 2A, the control unit 21 starts a user authentication process shown in FIG. 8 (S2).

The card reading unit 26 reads the user information consisting of the user ID and the password from the IC card, and outputs the user information to the control unit 21. The control unit 21 determines whether or not the authentication is established depending on whether or not the user information output from the card reading unit 26 is recorded in the user information table 221 (S21).

In a case where the authentication is established (S21: Yes), a print job selection screen is displayed on the operation display unit 23, and the print job selection is accepted (S22). On the print job selection screen, a list of print jobs accumulated in the print job accumulation unit 222 by the authenticated user and print jobs accumulated in the print job accumulation unit 222 of the other printing apparatus 2 is displayed, and the user can select a print job to be executed from the list of print jobs. In a case where the user selects the print job to be executed and operates a "confirm" button, the control unit 21 reads the confirmed print job from the print job accumulation unit 222.

In a case where the authentication is not established in step S21 (S21: No), a gist that the authentication is not established is displayed on the operation display unit 23 (S23).

In a case where the authentication process is completed, in step S3 shown in FIG. 7, the control unit 21 determines whether or not the print job selected by the user is accumulated in another printing apparatus 2 (S3). In a case where the print job selected by the user is accumulated in the other printing apparatus 2 (S3: Yes), the control unit 21 makes a transfer request to the other printing apparatus 2 and receives the print job (S4).

The control unit 21 extracts the post-processing information from the print job (S5).

The control unit 21 determines whether or not the post-processing required by the post-processing information can be performed (S6). Specifically, the control unit 21 determines whether or not the post-processing required by the post-processing information is satisfied by the post-processing information recorded in the post-processing information table 224. For example, in a case where the required post-processing is to perform stapling on 20 sheets of plain paper, the upper limit number of sheets for the stapling with respect to plain paper, which is shown in the post-processing information table 224, is 15 sheets, so that the control unit 21 determines that the post-processing cannot be performed.

Further, in a case where the consumable detection unit 291 detects the shortage of consumables and the shortage of the consumables (for example, staples for stapling) is in a situation in which the post-processing cannot be performed to correspond to the required post-processing (for example, stapling), the control unit 21 determines that the required post-processing of stapling cannot be performed.

In step S6, in a case where the control unit 21 determines that the post-processing can be performed (S6: Yes), the control unit 21 controls the image forming unit 25 so that the image based on the print data is printed on the paper (S7), and makes the paper transport unit 27 transfer the printed paper to the post-processing apparatus 29.

The post-processing apparatus 29 performs the post-processing on the printed paper transported by the paper transport unit 27 and outputs the printed paper from the discharge tray.

In step S6, in a case where all the post-processing cannot be performed (S6: No), whether or not the partial post-processing can be performed is determined (S8). In a case where the partial post-processing can be performed (S8: Yes), the control unit 21 displays a confirmation screen on the operation display unit 23 and accepts whether to stop or continue the partial the post-processing that can be performed (S9).

Figure 6:
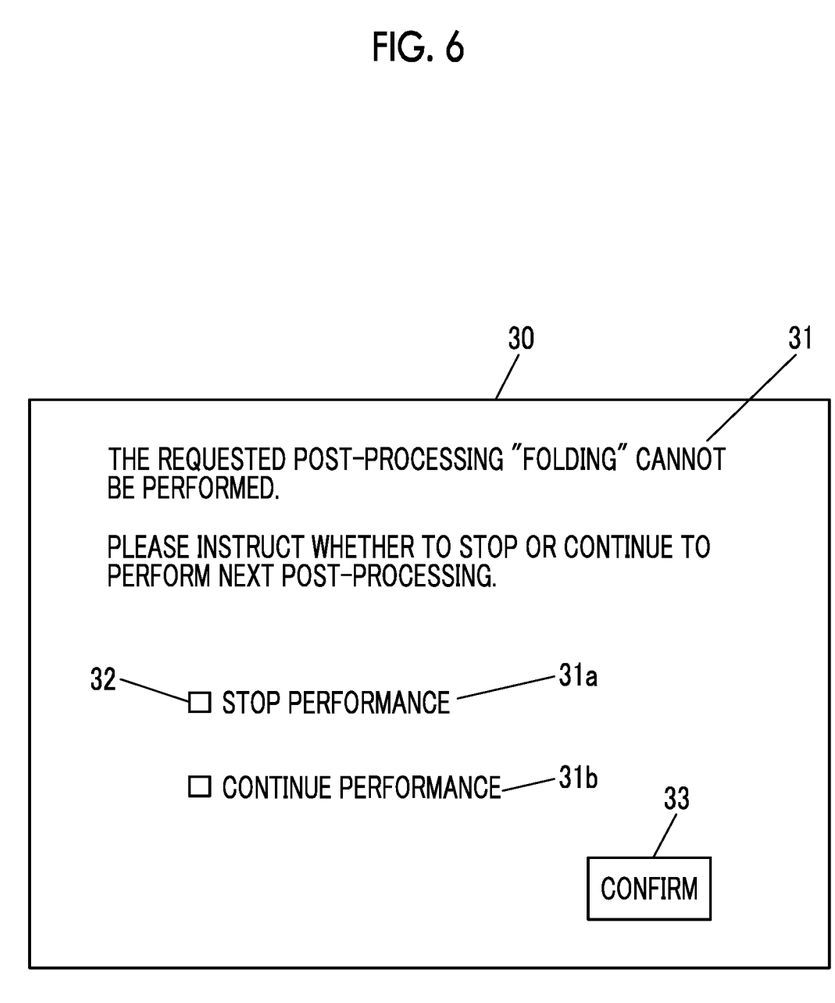
FIG. 6 is a diagram showing an example of a confirmation screen.

FIG. 6 is a diagram showing an example of the confirmation screen. The confirmation screen 30 includes a message 31 of "The requested post-processing "folding" cannot be performed. Please instruct whether to stop or continue to perform next post-processing.", an option 31a of "stop performance, an option 31b of "continue performance", a check box 32 for selecting any one of the options 31a and 31b, and a "confirmation" button 33 for confirming the checked and selected options 31a or 31b. Display of which post-processing cannot be performed helps determination of whether to stop or continue the post-processing that can be performed, display of which post-processing cannot be performed may not be performed.

In a case of stopping the post-processing of "folding", the user checks the check box 32 corresponding to the option 31a and operates the "confirm" button 33. In a case of performing the post-processing of "folding", the user checks the check box 32 corresponding to the option 31b and operates the "confirm" button 33.

Next, the auxiliary image is generated with reference to the auxiliary image information table 223 (S10). Here, the auxiliary image is generated for the post-processing determined to not be performed in step S6 and the post-processing stopped to be performed in step S9.

The image forming unit 25 superimposes the auxiliary image on the print data (S11). In a case where an image including the auxiliary image is printed on the paper and the post-processing is not performed, the paper transport unit 27 transports the printed paper to the discharge tray without transporting the printed paper to the post-processing apparatus 29. In a case where partial post-processing of the requested post-processing is performed, the paper transport unit 27 transports the printed paper to the post-processing apparatus 29, and transports the paper to the discharge tray after performing the post-processing.

(2) Case where Printing Apparatus that Does Not Include Post-Processing Apparatus is Used (First Specific Example)

A certain user (here, referred to as a user A) transmits the print job including the post-processing from the client PC 3 of the user to the first printing apparatus 2A including the post-processing apparatus 29. The print job transmitted to the first printing apparatus 2A is accumulated in the print job accumulation unit 222 corresponding to the user A of the first printing apparatus 2A. In a case where the print job is transmitted, another printing apparatus 2 also accumulates the print job in the print job accumulation unit 222 (S1).

Thereafter, the user A goes to the first printing apparatus 2A. However, since the first printing apparatus 2A is outputting a large amount of paper, the user A thinks that, in a case where the user waits until the output is completed, the user will not be able to meet the start time of a conference, so that the user tries to cause the print job transmitted to the first printing apparatus 2A to be printed by the third printing apparatus 2C which does not have the post-processing function in order to manually perform the post-processing. That is, the user A receives authentication in the third printing apparatus 2C (S2). Here, since the print job is accumulated in the first printing apparatus 2A (S3: Yes), the third printing apparatus 2C requests the first printing apparatus 2A to transfer the print job, receives the print job (S4), and executes only printing (S7). Here, the first printing apparatus 2A is an example of the first printing apparatus, and the processor of the first printing apparatus 2A is an example of a first processor. The third printing apparatus 2C is an example of the second printing apparatus, and the processor of the third printing apparatus 2C is an example of a second processor.

Since the third printing apparatus 2C does not include the post-processing apparatus 29, the post-processing cannot be performed (S6: No), and the partial post-processing cannot be performed (S8: No). Therefore, the auxiliary image representing the post-processing is formed (S10), the auxiliary image is superimposed on the print data (S11), and an image including the auxiliary image is printed on the paper (S7).

The user A manually performs the post-processing depending on the auxiliary image printed on the paper that is output to the discharge tray of the third printing apparatus 2C.

(3) Case where Post-Processing is Stopped Because Post-Processing Capacity is Low (Second Specific Example)

Here, it is assumed that the upper limit number of sheets for stapling with respect to the plain paper is 15 sheets in the first printing apparatus 2A, the upper limit number of sheets for stapling with respect to the plain paper is 10 sheets in the second printing apparatus 2B, and content of the post-processing included in the print job is to perform stapling every 12 sheets.

A certain user (here, referred to as a user B) transmits the print job including the post-processing (stapling is performed every 15 sheets) from the client PC 3 of the user to the first printing apparatus 2A in which the upper limit number of sheets for stapling is 20 sheets. The print job transmitted to the first printing apparatus 2A is accumulated in the print job accumulation unit 222 corresponding to the user B of the first printing apparatus 2A. In a case where the print job is transmitted, another printing apparatus 2 also accumulates the print job in the print job accumulation unit 222 (S1).

Thereafter, the user B goes to the first printing apparatus 2A. However, it is assumed that the first printing apparatus 2A is installed far away and the second printing apparatus 2B in which the upper limit number of sheets for stapling is 10 is installed near. Since the second printing apparatus 2B cannot perform the post-processing (perform stapling every 12 sheets), the user B tries to cause the print job transmitted to the first printing apparatus 2A, in which the post-processing capacity is high, to be printed by the second printing apparatus 2B, in which the post-processing capacity is low, in order to manually perform the post-processing. That is, the user B receives authentication in the third printing apparatus 2B (S2). Here, since the print job is accumulated in the first printing apparatus 2A (S3: Yes), the second printing apparatus 2B requests the first printing apparatus 2A to transfer the print job, receives the print job (S4), and executes only printing (S7). Here, the first printing apparatus 2A is an example of the first printing apparatus, and the processor of the first printing apparatus 2A is the example of the first processor. The second printing apparatus 2B is an example of the second printing apparatus, and a processor of the second printing apparatus 2B is the example of the second processor.

In the second printing apparatus 2B, the post-processing capacity is low, so that the post-processing cannot be performed (S6: No) and the partial post-processing cannot be performed (S8: No). Therefore, the auxiliary image representing the post-processing is formed (S10), the auxiliary image is superimposed on the print data (S11), and the image including the auxiliary image is printed on the paper (S7).

The user B manually performs the post-processing (stapling) depending on the auxiliary image printed on the paper output to the discharge tray of the second printing apparatus 2B.

(4) Case of Stopping Post-Processing Whose Part Can be Performed (Third Specific Example)

Since the paper used for the print job is a mixture of A4 size and A3 size, in a case where post-processing of folding A3 size paper into the A4 size and post-processing of stapling are scheduled to be performed as the post-processing, it is assumed that the first printing apparatus 2A is installed in the company, the second printing apparatus 2B is installed in a branch, and the first printing apparatus 2A installed in the company has a function of performing the post-processing of folding and stapling, but the second printing apparatus 2B installed in the branch can perform post-processing of stapling but cannot perform the post-processing of folding.

A certain user (here, referred to as a user C) is working in a company but the user is decided to work at a branch office. The print job including the post-processing (performing folding and stapling) is transmitted to the first printing apparatus 2A in the company. The print job transmitted to the first printing apparatus 2A in the company is accumulated in the print job accumulation unit 222 of the first printing apparatus 2A (S1).

Thereafter, the user C goes to the branch office, makes a transfer request from the second printing apparatus 2B installed in the branch office to the first printing apparatus 2A set in the company, and the second printing apparatus 2B receives the print job (S4). The first printing apparatus 2A installed in the company transfers the print job to the second printing apparatus 2B installed in the branch office. The second printing apparatus 2B accumulates the transferred print job in the print job accumulation unit 222. Here, the first printing apparatus 2A is an example of the first printing apparatus, and the processor of the first printing apparatus 2A is the example of the first processor. The third printing apparatus 2C is an example of the second printing apparatus, and the processor of the third printing apparatus 2C is the example of the second processor.

The second printing apparatus 2B installed in the branch office cannot perform the partial post-processing (folding) (S6: No) and can perform the partial post-processing (stapling) (S8: Yes), so that the second printing apparatus 2B displays the confirmation screen 30 shown in FIG. 6 on the operation display unit 23, and accepts the stop or continuation of performance (S9).

It is assumed that the user C stops the stapling that can be performed because it is difficult to manually fold the stapled paper. In this case, the folding image and the stapling image are generated (S10), and the print data including the folding image and the stapling image is printed on the paper (S11). Here, the folding image is an example of the first auxiliary image. The stapling image is an example of the second auxiliary image.

The user C manually performs the post-processing (folding and stapling) depending on the auxiliary image printed on the paper output to the discharge tray of the second printing apparatus 2B installed in the branch office.

As another example similar to the third specific example, in a case where the user designates a booklet (middle binding+middle folding) and three-way cutting (a function of cutting other than binding and finishing beautifully), but the staples for stapling are insufficient, so that only middle binding can be performed, the middle folding and three-way cutting can be performed but, in a case where cutting is performed before binding, the finish will not be beautiful, so that the stop of a cutting process according to an instruction of the user is considered.

First Modification Example

In the above exemplary embodiment, the print job is transmitted from the client PC 3 to the printing apparatus 2 and the print job is accumulated in the printing apparatus 2. However, the print job may be transmitted from the client PC 3 to a server to be accumulated in the server, and the printing apparatus 2 may be logged in to perform the authentication process so that the print job is downloaded from the server to the printing apparatus 2.

Second Modification Example

In the above exemplary embodiment, in the third specific example, in a case where the partial post-processing (folding) cannot be performed, whether or not to perform another post-processing (stapling) that can be performed is left to the determination of the user. However, depending on the settings of the user or the manager, other post-processing that can be performed may not be performed.

Third Modification Example

In the above exemplary embodiment, in a case where the auxiliary image is printed on the paper, the auxiliary image is printed on all sheets of paper, but the auxiliary image may be printed only on a first sheet or a first page, and the auxiliary image may be printed for each predetermined number of pages (for example, 10 pages).

Although the exemplary embodiment of the present invention has been described above, the exemplary embodiment of the present invention is not limited to the above exemplary embodiment, and various modifications and implementations are possible.

Each means of the processor may be configured with hardware circuits such as a Field Programmable Gate Array (FPGA) and an Application Specific Integrated Circuit (ASIC), which are partially or wholly reconfigurable.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, some of the components of the above exemplary embodiment may be omitted or changed. Further, in the flow of the above exemplary embodiment, steps maybe added, deleted, changed, replaced, or the like. Further, the program used in the above exemplary embodiment can be recorded and provided on a computer-readable recording medium, such as a CD-ROM, and can be stored in an external server such as a cloud server, to be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control apparatus comprising:
a processor configured to:
receive instruction information including print data and post-processing information indicating content of post-processing scheduled to be performed on paper on which an image based on the print data is printed;
in a case where the post-processing included in the instruction information is not performed by a post-processing apparatus, generate an auxiliary image that assists a user to perform the post-processing, based on the post-processing information, and print the auxiliary image, together with the image based on the received print data, on the paper;
in a case where partial post-processing of the post-processing included in the instruction information is not performed, generate a first auxiliary image that assists in the partial post-processing that is not performed; and
in a case where an instruction not to perform the post-processing scheduled to be performed is provided, a second auxiliary image that assists in the post-processing scheduled to be performed, and print the first auxiliary image and the second auxiliary image, together with the image based on the print data, on the paper.

2. The printing control apparatus according to claim 1, wherein the processor is configured to:
display, on a display device, a confirmation screen displaying content of post-processing scheduled to be performed other than the partial post-processing of the post-processing.

3. The printing control apparatus according to claim 2, wherein the confirmation screen also displays content of post-processing that cannot be performed due to a situation on a side of a printing apparatus that prints the image based on the print data.

4. A printing apparatus that is connected to another printing apparatus, the printing apparatus comprising:
a processor configured to:
accept selection of print data accumulated in the other printing apparatus from a user;
receive instruction information including the print data and post-processing information indicating content of post-processing scheduled to be performed on paper on which the print data is printed, from the other printing apparatus, based on the selection;
in a case where the post-processing included in the instruction information is not performed by a post-processing apparatus, generate an auxiliary image that assists the user to perform the post-processing, based on the post-processing information, and print the auxiliary image, together with an image based on the received print data, on the paper;
in a case where partial post-processing of the post-processing included in the instruction information is not performed, generate a first auxiliary image that assists in the partial post-processing that is not performed; and
in a case where an instruction not to perform the post-processing scheduled to be performed is provided, a second auxiliary image that assists in the post-processing scheduled to be performed, and print the first auxiliary image and the second auxiliary image, together with the image based on the print data, on the paper.

5. The printing apparatus according to claim 4, wherein the processor is configured to:
display, on a display unit, a confirmation screen displaying content of post-processing scheduled to be performed other than the partial post-processing of the post-processing.

6. The printing apparatus according to claim 5, wherein the confirmation screen also displays content of post-processing that cannot be performed due to a situation on a side of the printing apparatus that prints the image based on the print data.

7. A non-transitory computer readable medium storing a program causing a computer to execute a process comprising:
receiving instruction information including print data and post-processing information indicating content of post-processing scheduled to be performed on paper on which an image based on the print data is printed;
in a case where the post-processing included in the instruction information is not performed by a post-processing apparatus, generating an auxiliary image that assists a user to perform the post-processing, based on the post-processing information, and printing the auxiliary image, together with the image based on the received print data, on the paper; and
in a case where partial post-processing of the post-processing included in the instruction information is not performed, generating a first auxiliary image that assists in the partial post-processing that is not performed;
in a case where an instruction not to perform the post-processing scheduled to be performed is provided, a second auxiliary image that assists in the post-processing scheduled to be performed, and printing the first auxiliary image and the second auxiliary image, together with the image based on the print data, on the paper.

\* \* \* \* \*